United States Patent
Morimoto et al.

(10) Patent No.: US 7,269,193 B2
(45) Date of Patent: Sep. 11, 2007

(54) SEMICONDUCTOR LASER DRIVING CIRCUIT AND IMAGE RECORDING APPARATUS

(75) Inventors: Yoshinori Morimoto, Kanagawa (JP); Tsuyoshi Tanabe, Kanagawa (JP); Kenichi Saito, Kanagawa (JP); Yoichi Suzuki, Kanagawa (JP); Tadashi Masuda, Kanagawa (JP); Kiyoshi Kondou, Kanagawa (JP)

(73) Assignee: Fuji Film Corp., Minami-Ashigara-shi (JP)

( * ) Notice: Subject to any disclaimer, the term of this patent is extended or adjusted under 35 U.S.C. 154(b) by 252 days.

(21) Appl. No.: 11/167,196

(22) Filed: Jun. 28, 2005

(65) Prior Publication Data
US 2006/0017797 A1 Jan. 26, 2006

(30) Foreign Application Priority Data
Jun. 28, 2004 (JP) ............................. 2004-189393

(51) Int. Cl.
*H01S 3/00* (2006.01)
*B41J 2/435* (2006.01)
*B41J 2/47* (2006.01)

(52) U.S. Cl. .................... 372/38.02; 347/224; 347/252

(58) Field of Classification Search ................ 347/237, 347/252, 238, 224; 361/18; 330/306; 372/29.011, 372/38.02, 29.021; 360/67; 363/21.08
See application file for complete search history.

(56) References Cited

U.S. PATENT DOCUMENTS

| | | | | |
|---|---|---|---|---|
| 4,593,338 | A * | 6/1986 | Takeda et al. | ................. 361/18 |
| 5,008,634 | A * | 4/1991 | Christian | ..................... 330/306 |
| 5,036,519 | A * | 7/1991 | Ema et al. | ............. 372/29.011 |
| 5,818,656 | A * | 10/1998 | Klaassen et al. | ............... 360/67 |
| 6,021,144 | A * | 2/2000 | Meyer et al. | ............. 372/38.02 |
| 6,314,005 | B1 * | 11/2001 | Nishi et al. | ............... 363/21.08 |
| 6,498,617 | B1 * | 12/2002 | Ishida et al. | ................. 347/252 |
| 6,618,406 | B1 * | 9/2003 | Kaminishi | ............... 372/38.02 |
| 6,987,787 | B1 * | 1/2006 | Mick | ..................... 372/29.021 |

* cited by examiner

*Primary Examiner*—Hai Pham
*Assistant Examiner*—Carlos A. Martinez, Jr.
(74) *Attorney, Agent, or Firm*—Birch, Stewart, Kolasch & Birch, LLP

(57) ABSTRACT

A semiconductor laser driving circuit for driving a semiconductor laser as an exposure light source is used in an image recording apparatus for recording an image using a light beam from the laser. The light beam emitted from the laser is subjected to pulse modulation in correspondence with a command signal. The circuit includes an error amplifier for amplifying a difference between the command signal and a signal fed back from the laser to output an output signal, a diode and a resistor connected in series between an input terminal and an output terminal of the error amplifier and a driver for driving the laser based on the output signal.

12 Claims, 4 Drawing Sheets

FIG. 3
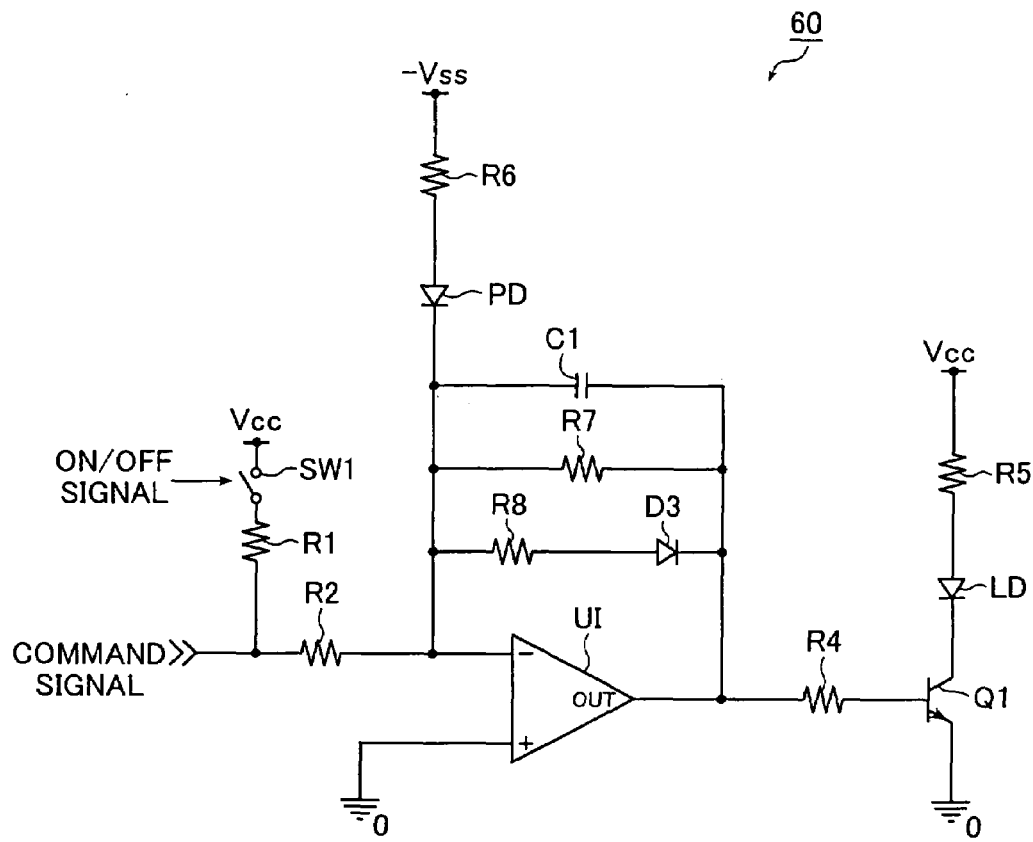
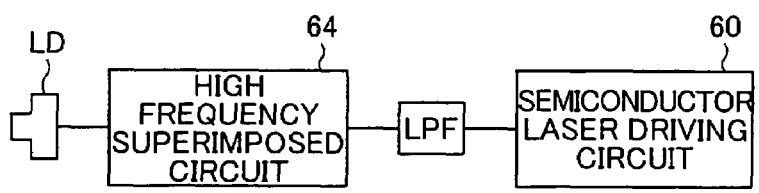
FIG. 5A
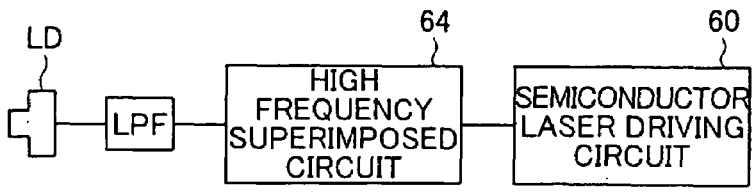
FIG. 5B

SEMICONDUCTOR LASER DRIVING CIRCUIT AND IMAGE RECORDING APPARATUS

This application claims priority on Japanese patent application No. 2004-189393, the entire contents of which are hereby incorporated by reference. In addition, the entire contents of literatures cited in this specification are incorporated by reference.

BACKGROUND OF THE INVENTION

The present invention relates to an image recording apparatus for recording an image using a semiconductor laser as an exposure light source and a semiconductor laser driving circuit applied thereto.

As for a semiconductor laser driving circuit, there are generally known a circuit including an automatic power control (APC) circuit used to feed back an output light amount of a light beam emitted from a semiconductor laser to control the output light amount of the light beam emitted from the semiconductor laser to be constant, and a circuit including an automatic current control (ACC) circuit used to feed back an amount of current caused to flow through the semiconductor laser to control the amount of current to be constant, thereby controlling an output light amount of the light beam from the semiconductor laser to be constant.

Either of the semiconductor laser driving circuit including the APC circuit and the semiconductor laser driving circuit including the ACC circuit includes an error amplifier for amplifying and outputting a difference (error) between a command signal in accordance with which turn-ON/turn-OFF of a semiconductor laser is controlled so that the semiconductor laser emits a light beam with a predetermined output light amount and a signal which is fed back from the semiconductor laser. The semiconductor laser is driven based on an output signal from the error amplifier, thereby allowing the semiconductor laser to invariably emit a light beam with a predetermined output light amount.

However, in the conventional semiconductor laser driving circuit, a consumed electric power of the above-mentioned error amplifier changes between the turn-ON state and the turn-OFF state of the semiconductor laser. For this reason, there arises a problem in that temperature drift is generated in the output signal from the error amplifier due to a temperature change caused by self-heating of the error amplifier, and thus the output light amount of the light beam from the semiconductor laser fluctuates. However, the fluctuation in the output light amount of light beam from the semiconductor laser due to the temperature drift in the output signal from the error amplifier cannot be controlled using the APC circuit or the ACC circuit.

Hence, an image recording apparatus for recording an image using the above-mentioned semiconductor laser driving circuit involves a problem in that the output light amount of the light beam from the semiconductor laser fluctuates in correspondence to the temperature drift in the output signal from the error amplifier, and thus an image quality of a recorded image is reduced.

In addition, in the conventional semiconductor laser driving circuit, there is also encountered a problem in that when the semiconductor laser driving circuit is influenced by an extraneous electric wave which is radiated from a mobile telephone, a wireless local area network (LAN) or the like, which has a high carrier frequency, and which is modulated with a frequency equal to or lower than an image frequency (a driving frequency for the semiconductor laser), the extraneous electric wave is demodulated in the semiconductor laser driving circuit to be outputted in the form of noises and thus the output light amount of the light beam from the semiconductor laser fluctuates.

In this case, similarly, there arises a problem in that the output light amount of the light beam emitted from the semiconductor laser fluctuates, and the image quality of the image recorded by the image recording apparatus deteriorates.

Note that it is a problem firstly posed by an inventor of the present invention that the output light amount of the light beam from the semiconductor laser fluctuates due to the temperature drift in the output signal from the error amplifier, and thus any of the conventional techniques is not associated with the present invention. This is also applied to the influence by the extraneous electric wave.

SUMMARY OF THE INVENTION

The present invention has been made in order to solve the above-mentioned problems associated with the conventional technique, and it is, therefore, an object of the present invention to provide a semiconductor laser driving circuit which is capable of invariably stabilizing an output light amount of a light beam emitted from a semiconductor laser at a predetermined output light amount, and an image recording apparatus therewith.

In order to attain the above-described object, a first aspect of the preset invention provides a semiconductor laser driving circuit used in an image recording apparatus for recording an image using a light beam from a semiconductor laser as an exposure light source, the light beam from the semiconductor laser being subjected to pulse modulation in correspondence with a command signal for controlling turn-ON/turn-OFF of the semiconductor laser, or an output light amount of the light beam emitted from the semiconductor laser, comprising:

an error amplifier for amplifying a difference between the command signal and a signal fed back from the semiconductor laser to output an output signal, the output signal in a turn-ON state of the semiconductor laser being opposite in voltage polarity to the output signal in a turn-OFF state of the semiconductor laser;

a diode and a resistor connected in series between an input terminal and an output terminal of the error amplifier; and a driver for driving the semiconductor laser based on the output signal from the error amplifier, wherein the diode is connected to apply a forward bias across the diode in the turn-OFF state of the semiconductor laser, and wherein a resistance value of the resistor is set so that a current which is nearly equal in amount to that caused to flow through the error amplifier when the semiconductor laser is in the turn-ON state in case that the semiconductor laser is subjected to pulse width modulation or pulse number modulation as the pulse modulation, or when the semiconductor laser is in the turn-ON state and emits the light beam with an intermediate level amplitude in case that the semiconductor laser is subjected to pulse amplitude modulation as the pulse modulation, is caused to flow through the error amplifier in the turn-OFF state of the semiconductor laser via the diode and the resistor.

In addition, in order to attain the above-described object, a second aspect of the present invention provides an image recording apparatus comprising:

a semiconductor laser used as an exposure light source; and a semiconductor laser driving circuit for having the semiconductor laser to be subjected to pulse modulation in correspondence with a command signal for controlling turn-ON/turn-OFF of the semiconductor laser, or an output light amount of a light beam emitted from the semiconductor laser, wherein image recording apparatus records an image using the light beam from the semiconductor laser subjected to the pulse modulation in correspondence with the command signal, wherein the semiconductor laser driving circuit comprises:

an error amplifier for amplifying a difference between the command signal and a signal fed back from the semiconductor laser to output an output signal, the output signal in a turn-ON state of the semiconductor laser being opposite in voltage polarity to the output signal in a turn-OFF state of the semiconductor laser;

a diode and a resistor connected in series between an input terminal and an output terminal of the error amplifier; and a driver for driving the semiconductor laser based on the output signal from the error amplifier, wherein the diode is connected to apply a forward bias across the diode in the turn-OFF state of the semiconductor laser, and wherein a resistance value of the resistor is set so that a current which is nearly equal in amount to that caused to flow through the error amplifier when the semiconductor laser is in the turn-ON state in case that the semiconductor laser is subjected to pulse width modulation or pulse number modulation as the pulse modulation, or when the semiconductor laser is in the turn-ON state and emits the light beam with an intermediate level amplitude in case that the semiconductor laser is subjected to pulse amplitude modulation as the pulse modulation, is caused to flow through the error amplifier in the turn-OFF state of the semiconductor laser via the diode and the resistor. That is, the second aspect of the present invention provides an image recording apparatus for recording an image using the semiconductor laser driving circuit according to the first aspect mentioned above.

In the first and second aspects of the present invention, preferably, the light beam of the intermediate level amplitude form a color of an average gray density when the image is recorded on a photosensitive material.

And, preferably, the error amplifier constitutes a part of an automatic power control circuit for controlling the output light amount of the light beam emitted from the semiconductor laser to be constant based on the output light amount of the light beam emitted from the semiconductor laser and fed back from the semiconductor laser, or the error amplifier constitutes a part of an automatic current control circuit for controlling the output light amount of the light beam emitted from the semiconductor laser to be constant by controlling the current caused to flow through the semiconductor laser and fed back from the semiconductor to be constant.

Preferably, the semiconductor laser is subjected to the pulse width modulation or the pulse number modulation as the pulse modulation in correspondence with the command signal for controlling the turn-ON/turn-OFF of the semiconductor laser, and the resistance value of the resistor is set so that the current which is nearly equal in amount to that caused to flow through the error amplifier in the turn-ON state of the semiconductor laser is caused to flow through the error amplifier in the turn-OFF state of the semiconductor laser via the diode and the resistor.

And, preferably, wherein the semiconductor laser is subjected to the pulse amplitude modulation as the pulse modulation in correspondence with the command signal for controlling the output light amount of the light beam emitted from the semiconductor laser, and the resistance value of the resistor is set so that the current which is nearly equal in amount to that caused to flow through the error amplifier when the semiconductor laser is in the turn-ON state and emits the light beam with the intermediate level amplitude is caused to flow through the error amplifier in the turn-OFF state of the semiconductor laser via the diode and the resistor.

The image recording apparatus according to the second aspect of the present invention further comprises:

a first low-pass filter that is provided between the semiconductor laser driving circuit and a substrate connector on an image processing circuit substrate to which the semiconductor laser driving circuit is mounted, and that has a cutoff frequency lower than a carrier frequency of extraneous electric wave as well as higher than an image frequency which is a driving frequency for the semiconductor laser, the extraneous electric wave having a high carrier frequency and being modulated with a frequency equal to or lower than the image frequency.

Preferably, the image recording apparatus further comprises:

a second low-pass filter that is provided on a power source line of the error amplifier and that has a cutoff frequency lower than the carrier frequency of the extraneous electric wave as well as higher than the image frequency.

Preferably, the image recording apparatus further comprises:

a high frequency superimposed circuit for superimposing a high frequency current on a driving current of the semiconductor laser; and a third low-pass filter that is provided between the semiconductor laser driving circuit and the high frequency superimposed circuit, or is provided between the high frequency superimposed circuit and the semiconductor laser, and that has a cutoff frequency lower than either lower one of a superimposed frequency of the high frequency superimposed circuit and the carrier frequency of the extraneous electric wave as well as higher than the image frequency.

Moreover, the image recording apparatus according to the second aspect of the present invention further comprises:

a first lower-pass filter that is provided between the semiconductor laser driving circuit and the semiconductor laser, and that has a cutoff frequency lower than a carrier frequency of extraneous electric wave as well as higher than an image frequency which is a driving frequency for the semiconductor laser, the extraneous electric wave having a high carrier frequency and being modulated with a frequency equal to or lower than the image frequency.

According to the first aspect of the present invention, it is possible to substantially equalize an amount of current caused to flow through an error amplifier in the turn-ON state of the semiconductor laser and an amount of current caused to flow through the error amplifier in the turn-OFF state of the semiconductor laser, i.e., an exothermic amount in the error amplifier in the turn-ON state of the semiconductor laser and an exothermic amount in the error amplifier in the turn-OFF state of the semiconductor laser. Therefore, the fluctuation in the output voltage of the error amplifier due to temperature drift can be prevented in both the turn-ON state and the turn-OFF state of the semiconductor laser. As a result, in the image recording apparatus according to the second aspect of the present invention using the semiconductor laser driving circuit according to the first aspect of the present invention, the output light amount of the light beam emitted from the semiconductor laser can be prevented from fluctuating, and hence an image of high quality can be recorded.

In addition, according to the second aspect of the present invention, the low-pass filter is suitably provided in the predetermined position, whereby the output light amount of the light beam emitted by the semiconductor laser can be prevented from fluctuating due to the influence by the extraneous electric waves in the semiconductor laser driving circuit. Consequently, in the image recording apparatus according to the second aspect of the present invention using the semiconductor laser driving circuit according to the first aspect of the present invention, since the output light amount of the light beam from the semiconductor laser can be prevented from fluctuating due to the influence by the extraneous electric wave in the semiconductor laser driving circuit to reduce the image quality of the recorded image, the recorded image of high image quality can be obtained.

BRIEF DESCRIPTION OF THE DRAWINGS

In the accompanying drawings:

FIG. 3 is a circuit diagram showing a configuration of a semiconductor laser driving circuit according to an embodiment of the present invention which is applied to the exposing unit shown in FIG. 1;

FIGS. 5A and 5B are respectively schematic diagrams of different embodiments each showing a layout of a low-pass filter in the semiconductor laser driving circuit of the present invention.

DESCRIPTION OF THE PREFERRED EMBODIMENTS

A semiconductor laser driving circuit and an image recording apparatus of the present invention will hereinafter be described in detail based on a preferred embodiment shown in the accompanying drawings.

Figure 1:
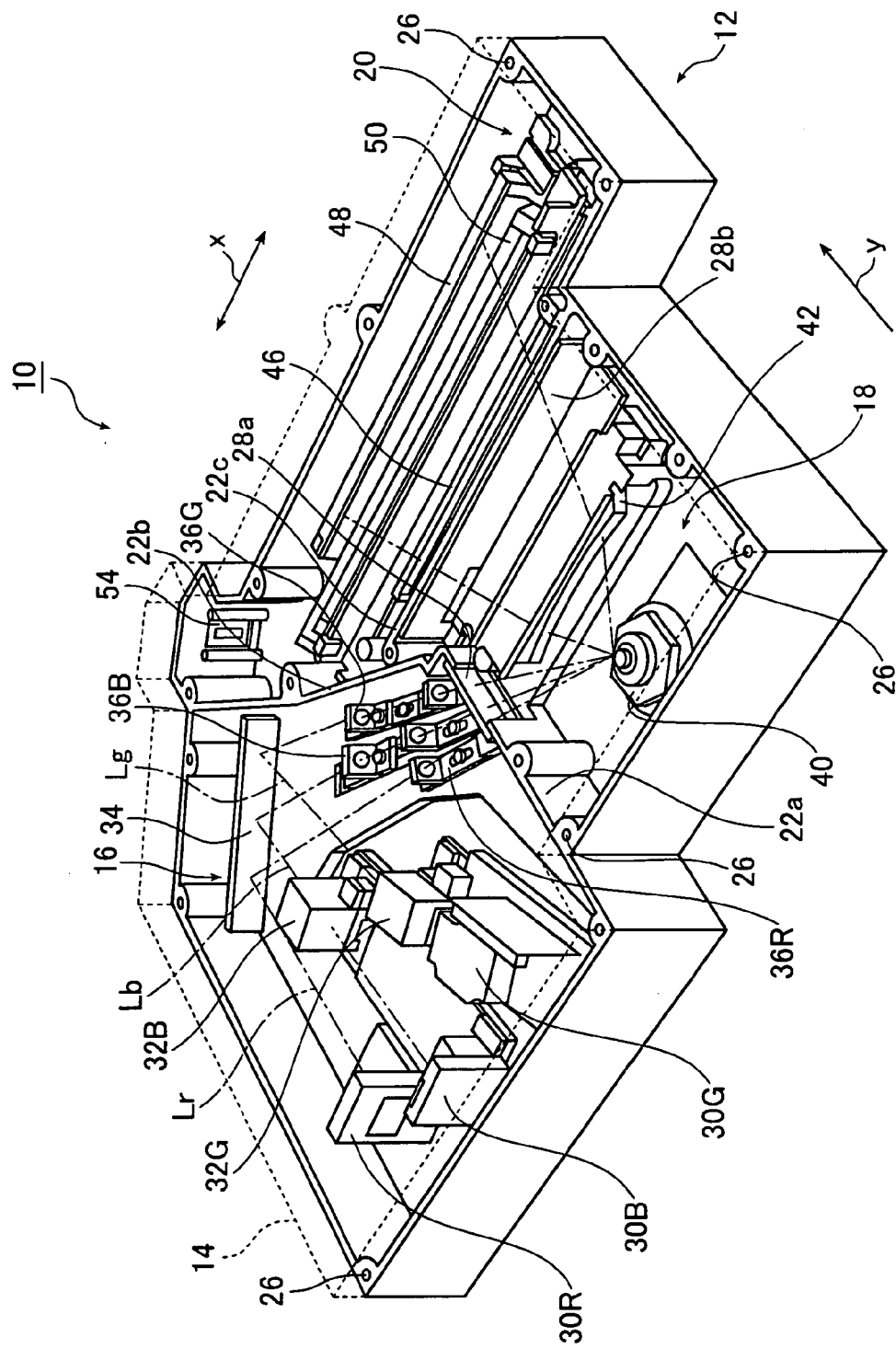
FIG. 1 is a schematic view showing an embodiment of a construction of an exposing unit to which a semiconductor laser driving circuit of the present invention is applied.
Figure 2:
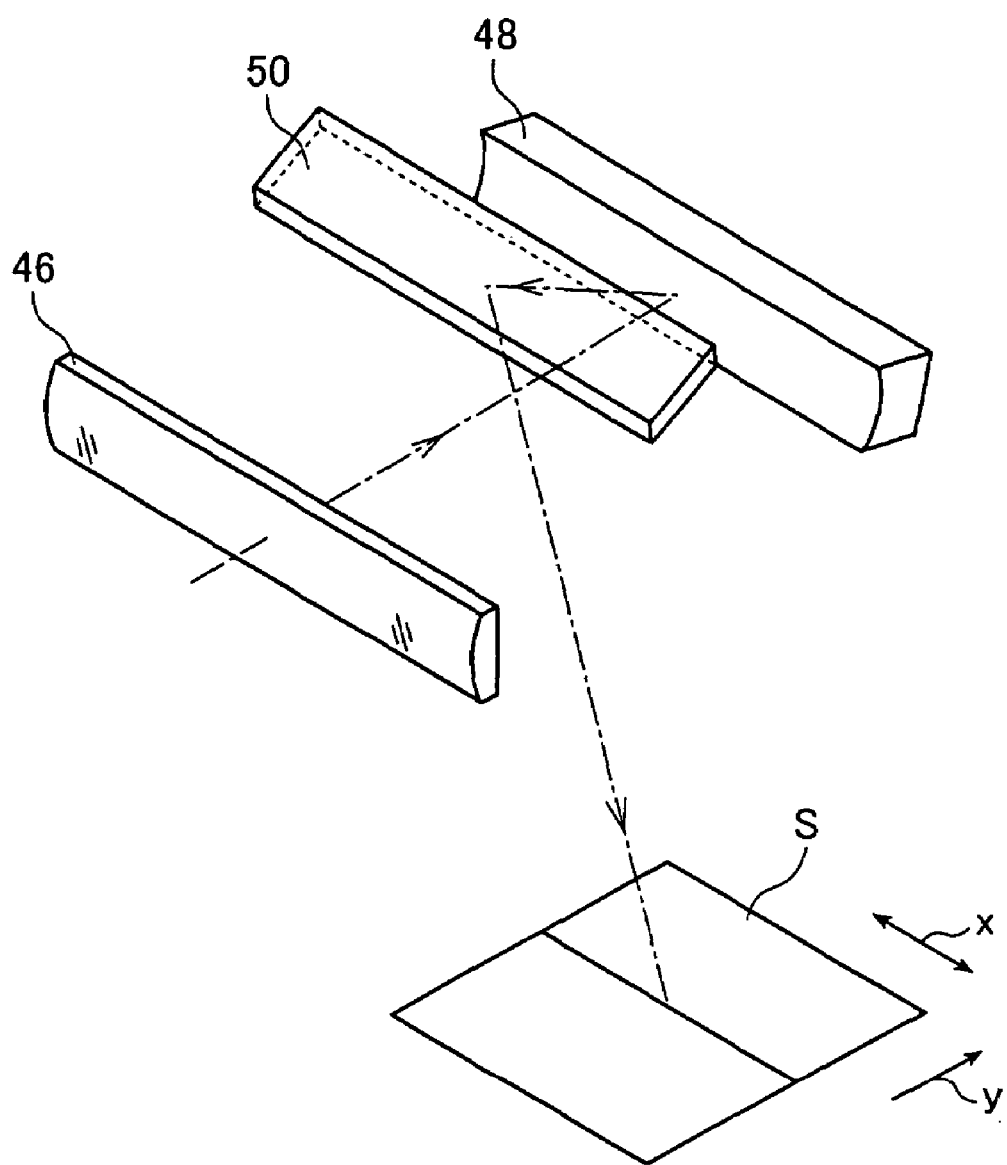
FIG. 2 is a schematic view showing a positional relationship among optical elements in the exposing unit shown in FIG. 1.

Firstly, an exposing unit (image recording apparatus) to which the semiconductor laser driving circuit of the present invention is applied will be described with reference to FIGS. 1 and 2 prior to a description of the semiconductor laser driving circuit of the present invention. FIG. 1 is a schematic view showing an embodiment of a construction of the exposing unit of an image recording apparatus of the present invention. In addition, FIG. 2 is a schematic view showing a positional relationship among optical elements in the exposing unit shown in FIG. 1.

In an exposing unit 10 shown in FIG. 1, three light beams (laser beams) L (Lr, Lb, and Lg) which correspond to R (Red) exposure, B (Blue) exposure, and G (Green) exposure and which are modulated in correspondence to an image to be recorded (image data) are deflected in a main scanning direction (a direction indicated by an arrow x in FIG. 1) to be made incident to a predetermined recording position (exposure position), whereby a photosensitive material S (see FIG. 2) which is conveyed in a sub scanning direction (a direction indicated by an arrow y in FIG. 1) nearly perpendicularly intersecting the main scanning direction is two-dimensionally scanned and exposed to the three light beams L to record an image.

Such an exposing unit 10 is utilized, for example, in a printer (printing apparatus) of a digital photographing system which produces a photographic print from image data obtained by photoelectrically reading an image photographed on a photographic film, image data of an image which is photographed with a digital camera, or the like.

In the example shown in FIG. 1, the exposing unit 10 includes a frame 12 as a chassis having one open face, a cover 14 (represented by a dotted line in FIG. 1) for covering the open face (upper face) of the frame 12, and various kinds of optical elements which are disposed and fixed at predetermined positions in the frame 12.

In the example shown in FIG. 1, the frame 12 is the chassis operating as an optical plate which is provided in a light beam scanning optical system and which serves to accommodate/fix the various optical elements constituting the light beam scanning optical system. In the example shown in FIG. 1, the frame 12 is made, for example, of an aluminum alloy, and its inside is roughly separated through partition walls 22 (22a, 22b, and 22c) into a light source portion 16, a light deflecting portion 18, and an emission portion 20.

A cutout is formed in a portion of the partition wall 22a corresponding in position to optical paths of the light beams L, and a transparent window member 28a is fixed to the cutout. Similarly, a cutout is formed in a portion of the partition wall 22c as well, corresponding in position to the optical paths of the light beams L, except for an upper portion of the partition wall 22c. Also a transparent window member 28b is fixed to the cutout. The frame 12 is covered with the cover 14, and the cover 14 is fixed to the frame 12 by screwing in a predetermined number of tapped holes 26 formed near an external wall and the partition walls 22.

A light source 30R for emitting the light beam Lr with which the R exposure is carried out, a light source 30B for emitting the light beam Lb with which the B exposure is carried out, a light source 30G for emitting the light beam Lg with which the G exposure is carried out, an acoustic-optical modulator (AOM) 32B for modulating the light beam Lb, an AOM 32G for modulating the light beam Lg, a mirror 34 for reflecting the light beams L (Lb, Lg, Lr), light amount/beam focus adjusting means 36R for adjusting a light amount and a beam focus (beam diameter) of light beam Lr, light amount/beam focus adjusting means 36B for adjusting a light amount and a beam focus of light beam Lb, and light amount/beam focus adjusting means 36G for adjusting a light amount and a beam focus of light beam Lg are disposed in the light source portion 16 provided inside the frame 12 in the example shown in FIG. 1.

In the example shown in FIG. 1, each of the light source 30R of the light beam Lr and the light source 30B of the light beam Lb is a laser diode (LD, i.e., semiconductor laser). The light source 30G of the light beam Lg is obtained by combining the LD and a second harmonics generation element (SHG element, i.e., wavelength conversion element) and emits the light beam Lg having a ½ wavelength (second harmonic) of a wavelength of the light beam emitted from the LD. In addition, the light beam Lr is modulated in correspondence to image data through direct modulation operation for modulating and driving the light source 30R, and the light beams Lb and Lg are modulated in correspondence to the image data by the AOMs 32B and 32G, respectively. Both the modulation of the light beam Lr through direct modulation of the light source 30R (LD) and the modulations of the light beams Lb and Lg by the AOMs 32B and 32G are pulse modulation in correspondence to the image data, and the pulse modulation may be either of pulse amplitude modulation (PAM), pulse width modulation (PWM), and pulse number modulation (PNM).

In addition, a polygon mirror 40 and an fθ lens (scanning lens) 42 are disposed in the light deflecting portion 18.

Moreover, a cylindrical lens 46, a cylindrical mirror 48, and a mirror 50 for downward reflecting a light beam are disposed in the emission portion 20 to show a positional relationship shown in FIG. 2. The light beams L are obliquely reflected slightly upward by the cylindrical mirror 48, and are then reflected downward by the mirror 50 for downward reflecting a light beam. Note that the cylindrical lens 46 and the cylindrical mirror 48 constitute an optical face tangle error correcting system for the polygon mirror 40.

In addition, in order to determine a start-of-scan (SOS) position for the photosensitive material S, an optical sensor 54 for detecting the light beam Lr corresponding to the R exposure is disposed in the emission portion 20 in the frame 12.

The light beam Lr corresponding to the R exposure is modulated in correspondence to the image to be recorded (the image data of R) to be emitted from the light source 30R, reflected by the mirror 34, adjusted with its light amount and beam focus by the light amount/beam focus adjusting means 36R, and then transmitted through the window member 28a, thereby being made incident to the polygon mirror 40.

In addition, the light beam Lb corresponding to the B exposure is emitted from the light source 30B, modulated in correspondence to the image to be recorded (the image data of B) by the AOM 32B, reflected by the mirror 34, adjusted with its light amount and beam focus by the light amount/beam focus adjusting means 36B, and then transmitted through the window member 28a, thereby being made incident to the polygon mirror 40. Similarly, the light beam Lg corresponding to the G exposure is emitted from the light source 32G, modulated in correspondence to the image to be recorded (the image data of G) by the AOM 30G, reflected by the mirror 34, adjusted with its light amount and beam focus by the light amount/beam focus adjusting means 36G, and then transmitted through the window member 28a, thereby being made incident to the polygon mirror 40.

The light beams L (Lr, Lb, and Lg) are deflected in the main scanning direction by the polygon mirror 40 and are further adjusted by the fθ lens 42 so that the scanning speed is uniform. The light beams L which have passed through the fθ lens 42 are transmitted through the window portion 28b, pass through the cylindrical lens 46, and then are reflected by the cylindrical mirror 48, i.e., adjusted with their optical paths to correct the optical face tangle error, and are further reflected downward by the mirror 50 for downward reflecting a light beam to be made incident to the recording position (on the photosensitive material S).

In the exposing unit 10 in the example shown in FIG. 1, the three light beams L emitted from the light sources 30R, 30B, and 30G are made incident to the same point on the polygon mirror 40 to be deflected by the polygon mirror 40, and are then made incident to a predetermined recording position to form one and the same scanning line. Consequently, the light beams L travel through the optical paths which differ from each other in main scanning direction, but are approximately identical to each other in the sub scanning direction, to be made incident to the recording position (the optical beam scanning optical system for a nonoptical multiplexing wave).

When an image is recorded, the light beam Lr corresponding to the R exposure is detected by the optical sensor 54, and the SOS recording position for the photosensitive material S is determined. In addition, the photosensitive material S (photographic printing paper) is conveyed in the sub scanning direction at a predetermined speed in the recording position. Thus, the photosensitive material S is two-dimensionally scanned and exposed with the light beams L deflected in the main scanning direction to record a latent image. The photosensitive material S having the latent image formed thereon is supplied to a processor (developing processor) (not shown). Then, the various processings such as color development, bleach fixing, washing, drying, and classification are executed in the processor.

Next, the semiconductor laser driving circuit of the present invention which is applied to the exposing unit 10 shown in FIG. 1 will be described with reference to FIG. 3. FIG. 3 is a circuit diagram showing a configuration of the semiconductor laser driving circuit according to an embodiment of the present invention which is applied to the exposing unit 10 shown in FIG. 1.

A semiconductor laser driving circuit 60 shown in FIG. 3 is mounted on an image processing circuit substrate (not shown), and serves to drive the semiconductor laser LD of the exposure light source 30R of the exposing unit 10 shown in FIG. 1. The semiconductor laser driving circuit 60 includes an APC circuit for controlling the output light amount of light beam Lr emitted invariably from the semiconductor laser LD. In this embodiment, it is supposed that the semiconductor laser LD is turned ON to emit a light beam with a predetermined output light amount when an output voltage from an error amplifier UI is positive in sign, and is turned OFF when the output voltage from the error amplifier UI is negative.

In the semiconductor laser driving circuit 60 shown in FIG. 3, a noninverting input terminal (+) of the error amplifier UI is connected to the ground (having 0 V).

On the other hand, an inverting input terminal (−) of the error amplifier UI is connected to a command signal (an input source) through a resistor R2, and is also connected to a power supply $V_{cc}$ as a positive voltage source through a resistor R1 and a switch SW1. The command signal is a signal in accordance with which turn-ON/turn-OFF of the semiconductor laser LD is controlled so that the semiconductor laser LD emits a light beam with a predetermined output light amount. In addition, turn-ON/turn-OFF of the switch SW1 is similarly controlled in accordance with an ON/OFF signal supplied from an image processing circuit.

The resistor R1 and the switch SW1 are means for causing an input signal (command signal) to have a positive voltage level in order to cause an output signal from the error amplifier UI to be a negative voltage when the semiconductor laser LD is turned OFF. The means for causing the output signal of the error amplifier UI to be the negative voltage is not limited thereto. For example, it is possible to use various means such as a circuit for applying a negative offset voltage to the noninverting input terminal (+) of the error amplifier UI.

The inverting input terminal (−) of the error amplifier UI is also connected to a power supply $-V_{ss}$ as a negative voltage source through a photodiode PD and a resistor R6. The photodiode PD is a photoelectric conversion element constituting the APC circuit together with the error amplifier UI. A cathode of the photodiode PD is connected to the inverting input terminal (−) of the error amplifier UI to apply a reverse bias across the photodiode PD. The photodiode PD receives the output light beam emitted from the semiconductor laser LD and generates a current corresponding to the output light amount of output light beam.

A resistor R7 and a capacitor C1 are connected in parallel between the inverting input terminal (−) and an output terminal OUT of the error amplifier UI. In addition, a resistor R8 and a diode D3 which are connected in series with each other are connected between the inverting input terminal (−) and the output terminal OUT of the error amplifier UI. A cathode of the diode D3 is connected to the output terminal OUT of the error amplifier UI to apply a forward bias across the diode D3 when the semiconductor laser LD is in a turn-OFF state, i.e., when the output voltage from the error amplifier UI is negative.

In addition, a signal outputted through the output terminal OUT of the error amplifier UI is inputted through a resistor R4 to a base of a bipolar transistor Q1 adapted to act as a driver for driving the semiconductor laser LD. The error amplifier UI operates so that a voltage at the inverting input terminal (−) and a voltage at the noninverting input terminal (+) become equal to each other (0 V in the case of this embodiment). As a result, the voltage of the signal supplied to the left-hand side terminal of the resistor R2 is inverted and amplified in the error amplifier UI and outputted through the output terminal OUT of the error amplifier UI.

A collector of the bipolar transistor Q1 is connected to a power supply $V_{cc}$ as a positive voltage source through a semiconductor laser LD and a resistor R5, and an emitter thereof is connected to the ground (having 0 V). When a voltage of a signal supplied to the base of the bipolar transistor Q1 becomes larger than a base to emitter voltage $V_{be}$, the bipolar transistor is turned ON. As a result, a base current is caused to flow and a predetermined current is caused to flow from the power supply $V_{cc}$ to the ground through the resistor R5, the semiconductor laser LD, and the bipolar transistor Q1.

A cathode of the semiconductor laser LD is connected to the collector of the bipolar transistor Q1 to apply a forward bias across the semiconductor laser LD. When the bipolar transistor Q1 is turned ON, the semiconductor laser LD is turned ON accordingly to emit a light beam with an output light amount corresponding to an amount of current caused to flow through the semiconductor laser LD itself.

Subsequently, an operation of the semiconductor laser driving circuit 60 will be described.

When the semiconductor laser LD is turned ON, the switch SW1 is turned OFF in accordance with the ON/OFF signal, and a negative voltage is inputted as the command signal.

The negative voltage of the command signal is supplied to the inverting input terminal (−) of the error amplifier UI through the resistor R2 and is then inverted and amplified by the error amplifier UI. Thus, a voltage (output voltage) of a signal outputted through the output terminal OUT of the error amplifier UI becomes positive. At this time, a current (ON-current) is caused to flow from the output terminal OUT of the error amplifier UI to an image processing circuit (an output circuit for the command circuit) (not shown) through the resistors R7 and R2.

The output voltage from the error amplifier UI is inputted to the base of the bipolar transistor Q1 through the resistor R4. When the base voltage of the bipolar transistor Q1, i.e., the output voltage from the error amplifier UI becomes larger than the base to emitter voltage $V_{be}$ of the bipolar transistor Q1, the bipolar transistor Q1 is turned ON. As a result, a base current is caused to flow, and a predetermined current is caused to flow from the power supply $V_{cc}$ toward the ground through the resistor R5, the semiconductor laser LD, and the bipolar transistor Q1. When the bipolar transistor Q1 is turned ON, the semiconductor laser LD is turned ON accordingly to emit a light beam with a light amount corresponding to an amount of current caused to flow through the semiconductor laser LD itself.

An output light beam from the semiconductor laser LD is inputted to the photodiode PD constituting the APC circuit. The photodiode PD generates a predetermined current corresponding to the output light amount of light beam from the semiconductor laser LD. The predetermined current is caused to flow from the inverting input terminal (−) of the error amplifier UI toward the power supply $-V_{ss}$ through the photodiode PD and the resistor R6. An amount of current caused to flow from the output terminal OUT of the error amplifier UI through the resistors R7 and R2 is controlled in correspondence to an amount of current caused to flow through the photodiode PD, and thus the output voltage from the error amplifier UI changes.

That is, when for example, the output light amount of the light beam from the semiconductor laser LD is more than a predetermined amount, the output voltage from the error amplifier UI is controlled by the APC circuit to decrease, and the output light amount of the light beam from the semiconductor laser LD is adjusted by the APC circuit to decrease. On the other hand, when the output light amount of the light beam from the semiconductor laser LD is less than a predetermined amount, the output voltage from the error amplifier UI is controlled by the APC circuit to increase, and the output light amount of the light beam from the semiconductor laser LD is adjusted by the APC circuit to increase.

By repeatedly carrying out the above-mentioned operation, the fluctuation in the output light amount of light beams from the semiconductor laser LD converges and thus the output light amount of the light beam from the semiconductor laser LD is stabilized to a predetermined output light amount.

Next, when the semiconductor laser LD is turned OFF, the switch SW1 is turned ON in accordance with the ON/OFF signal, and 0 V is inputted as the command signal.

In response thereto, a positive voltage supplied from the power supply $V_{cc}$ the error amplifier UI through the switch SW1, and the resistors R1 and R2 is inverted and amplified by the error amplifier UI, and thus the output voltage from the error amplifier UI becomes negative. Thus, the bipolar transistor Q1 is turned OFF and the semiconductor laser LD is turned OFF accordingly.

At this time, a current (OFF-current) which is caused to flow from the power supply $V_{cc}$ through the switch SW1, and the resistors R1 and R2 is caused to flow toward the output terminal OUT of the error amplifier UI through the resistor R8 and the diode D3. While a current is simultaneously caused to flow through the resistor R7 at this time, an amount of a current caused to flow through the resistor R7 can be practically disregarded as compared with an amount of a current caused to flow through the resistor R8 and the diode D3 since a resistance value of the resistor R7 is set as being large in order to make an amplification factor of the error amplifier UI larger.

Here, an amount of a current caused to flow through the error amplifier UI when the semiconductor laser LD is in a turn-OFF state can be adjusted by suitably setting the resistance value of the resistor R8. That is, in the semiconductor laser driving circuit 60, it is possible to practically equalize an amount of a current (ON-current) caused to flow through the error amplifier UI in the turn-ON state of the semiconductor laser LD and an amount of a current (OFF-current) caused to flow through the error amplifier UI in the turn-OFF state of the semiconductor laser LD, i.e., an exothermic amount in the error amplifier UI in the turn-ON state of the semiconductor laser LD and an exothermic amount in the error amplifier UI in the turn-OFF state of the semiconductor laser LD. For this reason, it is possible to prevent the fluctuation in the output voltage from the error amplifier UI due to the temperature drift in the turn-ON state and the turn-OFF state of the semiconductor laser LD. As a result, in the image recording apparatus using the semiconductor laser driving circuit 60, the output light amount of the light beam from the semiconductor laser LD can be prevented from fluctuating, and hence an image of high image quality can be recorded.

The command signal to be inputted to the semiconductor laser driving circuit 60 may be any command signal as long as it can control turn-ON/turn-OFF, or the output light amount itself, of the semiconductor laser LD such that the command signal is subjected to pulse modulation in correspondence to image data and the semiconductor laser LD emits a light beam with a predetermined output light amount. For instance, this may apply to either of the case where the command signal is subjected to pulse width modulation or pulse number modulation in correspondence to image data so as to control turn-ON/turn-OFF of the semiconductor laser LD, and the case where the command signal is subjected to pulse amplitude modulation in correspondence to image data so as to control the output light amount of the light beam from the semiconductor laser LD. That is, in the case of the pulse width modulation or pulse number modulation, the command signal which has been subjected to the pulse width modulation or pulse number modulation in correspondence to the image data is inputted, while in the case of the pulse amplitude modulation, the command signal which has been subjected to the pulse amplitude modulation in correspondence to the image data is inputted.

In the case of the pulse width modulation or pulse number modulation, an amount of a current caused to flow through the error amplifier UI when the semiconductor laser LD is in a turn-ON state is constant (fixed). Hence, an amount of a current caused to flow through the error amplifier UI when the semiconductor laser LD is in a turn-OFF state is set as being equal to that of a current caused to flow through the error amplifier UI when the semiconductor laser LD is in the turn-ON state. On the other hand, in the case of the pulse amplitude modulation, an amount of a current caused to flow through the error amplifier UI when the semiconductor laser LD is in the turn-ON state is variable, and hence the amount of a current caused to flow through the error amplifier UI when the semiconductor laser LD is in a turn-Off state is set as being equal to, for example, that of the current caused to flow through the error amplifier UI when the semiconductor laser LD is in the turn-ON state and emits a light beam with an intermediate level amplitude. Here, the intermediate level amplitude refers to an average amplitude that is normally used when recording an image information. In the case of a recording on the photosensitive material S using the exposing unit 10 shown in FIG. 1, for example, the intermediate level amplitude corresponds to an amplitude at which a color of an average gray density, or a color of an intermediate density of gray is formed.

The semiconductor laser driving circuit of the present invention can be applied to a case where the output signal from the error amplifier in the turn-ON state of the semiconductor laser is opposite in voltage polarity to the output signal from the error amplifier in the turn-OFF state of the semiconductor laser. Thus, in a case where conversely to the case of the above-mentioned embodiment, the semiconductor laser LD is turned ON to emit a light beam with a predetermined output light amount when the output voltage from the error amplifier UI is negative, and is turned OFF when the output voltage from the error amplifier UI is positive, the direction of the diode D3 may be reversed and the switch SW1 may be connected to the power supply $-V_{ss}$ as the negative voltage source in the semiconductor laser driving circuit 60 shown in FIG. 3.

In addition, while the description has been given by giving the case where the APC circuit is used as an example, alternatively, the ACC circuit may also be used. Also, the resistors R2 and R7, the capacitor C1, and the resistor R4 are suitably provided as may be necessary, and thus are not essential constituent elements. Moreover, the disposition order of the resistor R8 and the diode D3 may be reversed, and the circuit configuration of the switch SW1 and the resistor R1, the resistor R6 and the photodiode PD, and the resistor R5, the semiconductor laser LD and the bipolar transistor Q1 may also be replaced with another circuit configuration having the same function as that of the circuit configuration.

Next, a description will be given with respect to circuit configurations suitable for reducing an influence by an extraneous electric wave in the semiconductor laser driving circuit 60 of the present invention with reference to FIGS. 4A to 4C, and FIGS. 5A and 5B.

As previously stated, in the conventional semiconductor laser driving circuit, there is encountered a problem in that when the semiconductor laser driving circuit is influenced by the extraneous electric wave which is radiated from a mobile telephone, a wireless local area network (LAN) or the like, which has a high carrier frequency, and which is modulated with a frequency equal to or lower than an image frequency (a driving frequency for the semiconductor laser), the extraneous electric wave is demodulated in the semiconductor laser driving circuit to be outputted in the form of noise and thus an output light amount of the light beam from the semiconductor laser fluctuates.

Figure 4A:
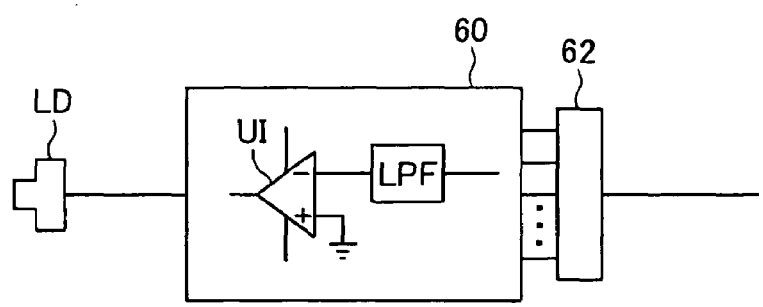
FIGS. 4A, 4B, and 4C are schematic diagrams of embodiments each showing a layout of a low-pass filter in the semiconductor laser driving circuit of the present invention.
Figure 4B:
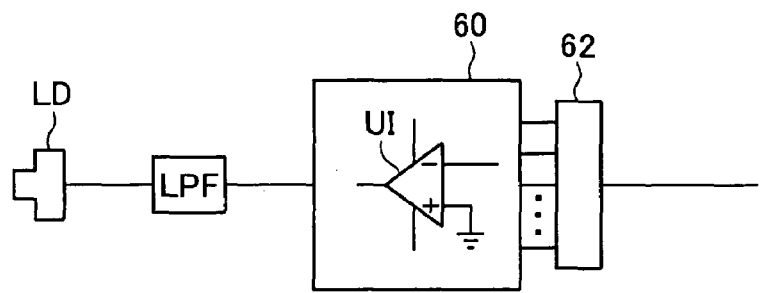

In order to prevent the output light amount of the light beam emitted from the semiconductor laser from fluctuating due to the influence by the extraneous electric waves in the semiconductor laser driving circuit 60 of the present invention, as shown in FIG. 4A, a low-pass filter LPF having a high cut-off frequency lower than the carrier frequency of the extraneous electric waves, but higher than the image frequency is provided between a substrate connector 62 on an image processing circuit substrate to which the semiconductor laser driving circuit 60 is mounted and the semiconductor laser driving circuit 60 (the error amplifier UI), or is provided between the semiconductor laser driving circuit 60 and the semiconductor laser LD as shown in FIG. 4B.

As described above, the low-pass filter LPF is suitably provided in the predetermined position, whereby the output light amount of the light beam emitted by the semiconductor laser LD can be prevented from fluctuating due to the influence by the extraneous electric waves in the semiconductor laser driving circuit 60. Consequently, in the image recording apparatus using the semiconductor laser driving circuit 60 of the present invention, since the output light amount of the light beam from the semiconductor laser LD can be prevented from fluctuating due to the influence by the extraneous electric wave in the semiconductor laser driving circuit 60 to reduce the image quality of the recorded image, the recorded image of high image quality can be obtained.

Figure 4C:
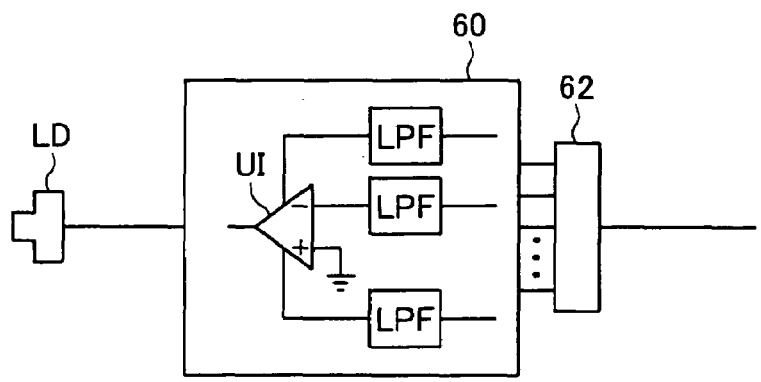

In particular, when the low-pass filter LPF is provided between the substrate connector 62 and the error amplifier UI, as shown in FIG. 4C, a low-pass filter LPF similarly having a cut-off frequency which is lower than the carrier frequency of the extraneous electric wave, but is higher than the image frequency is preferably provided in a power supply line (including a power supply side and a ground side) of the error amplifier UI separately from a bypass capacitor which is normally provided in the power supply line. As a result, this circuit configuration is very effective, because it is possible to reduce the noise due to the extraneous electric waves which are amplified and outputted by the error amplifier UI.

A phenomenon called mode hopping occurs in which a wavelength of the output light beam from the semiconductor laser LD hops due to the temperature fluctuation or the like. In order to suppress this phenomenon, a high frequency superimposed circuit 64 to superimpose a high frequency current on a driving current for the semiconductor laser LD is used in some cases.

In this case, in the semiconductor laser driving circuit 60 of the present invention, as shown in FIG. 5A, a low-pass filter having a cut-off frequency which is lower than a lower one between a superimposed frequency of the high frequency superimposed circuit 64 and a carrier frequency of the extraneous electric wave, but is higher than the image frequency is provided between the semiconductor laser driving circuit 60 and the high frequency superimposed circuit 64, or is provided between the high frequency superimposed circuit 64 and the semiconductor laser LD as shown in FIG. 5B.

As described above, when the high frequency superimposed circuit 64 is used, the low-pass filter LPF is suitably inserted into a predetermined position, whereby there is also obtained an effect that it is possible to reduce a problem with respect to the unnecessary radiation of an electric wave emitted from the high frequency superimposed circuit 64.

The low-pass filter LPF is not inserted only into one position and thus a plurality of low-pass filters LPFs may also be disposed in a plurality of positions as may be necessary. In addition, the position where the low-pass filter LPF is disposed may be suitably determined as necessary.

The present invention is basically as described above.

While the semiconductor laser driving circuit and the image recording apparatus of the present invention have been described so far forth, the present invention is not intended to be limited to the above-mentioned embodiment, and hence various improvements or changes may be made without departing from the gist of the present invention.

What is claimed is:

1. A semiconductor laser driving circuit used in an image recording apparatus for recording an image using a light beam from a semiconductor laser as an exposure light source, said light beam from said semiconductor laser being subjected to pulse modulation in correspondence with a command signal for controlling turn-ON/turn-OFF of said semiconductor laser, or an output light amount of said light beam emitted from said semiconductor laser, comprising:
   an error amplifier for amplifying a difference between said command signal and a signal fed back from said semiconductor laser to output an output signal, said output signal in a turn-ON state of said semiconductor laser being opposite in voltage polarity to said output signal in a turn-OFF state of said semiconductor laser;
   a diode and a resistor connected in series between an input terminal and an output terminal of said error amplifier; and
   a driver for driving said semiconductor laser based on said output signal from said error amplifier,
   wherein said diode is connected to apply a forward bias across said diode in said turn-OFF state of said semiconductor laser, and
   wherein a resistance value of said resistor is set so that a current which is nearly equal in amount to that caused to flow through said error amplifier when said semiconductor laser is in said turn-ON state in case that said semiconductor laser is subjected to pulse width modulation or pulse number modulation as said pulse modulation, or when said semiconductor laser is in said turn-ON state and emits said light beam with an intermediate level amplitude in case that said semiconductor laser is subjected to pulse amplitude modulation as said pulse modulation, is caused to flow through said error amplifier in said turn-OFF state of said semiconductor laser via said diode and said resistor.

2. The semiconductor laser driving circuit according to claim 1, wherein said light beam of said intermediate level amplitude form a color of an average gray density when said image is recorded on a photosensitive material.

3. The semiconductor laser driving circuit according to claim 1, wherein said error amplifier constitutes a part of an automatic power control circuit for controlling said output light amount of said light beam emitted from said semiconductor laser to be constant based on said output light amount of said light beam emitted from said semiconductor laser and fed back from said semiconductor laser.

4. The semiconductor laser driving circuit according to claim 1, wherein said error amplifier constitutes a part of an automatic current control circuit for controlling said output light amount of said light beam emitted from said semiconductor laser to be constant by controlling said current caused to flow through said semiconductor laser and fed back from said semiconductor to be constant.

5. The semiconductor laser driving circuit according to claim 1, wherein said semiconductor laser is subjected to said pulse width modulation or said pulse number modulation as said pulse modulation in correspondence with said command signal for controlling said turn-ON/turn-OFF of said semiconductor laser, and said resistance value of said resistor is set so that said current which is nearly equal in amount to that caused to flow through said error amplifier in the turn-ON state of said semiconductor laser is caused to flow through said error amplifier in the turn-OFF state of said semiconductor laser via said diode and said resistor.

6. The semiconductor laser driving circuit according to claim 1, wherein said semiconductor laser is subjected to said pulse amplitude modulation as said pulse modulation in correspondence with said command signal for controlling said output light amount of said light beam emitted from said semiconductor laser, and said resistance value of said resistor is set so that said current which is nearly equal in amount to that caused to flow through said error amplifier when said semiconductor laser is in the turn-ON state and emits said light beam with said intermediate level amplitude is caused to flow through said error amplifier in the turn-OFF state of said semiconductor laser via said diode and said resistor.

7. An image recording apparatus comprising:
   a semiconductor laser used as an exposure light source; and
   a semiconductor laser driving circuit for having said semiconductor laser to be subjected to pulse modulation in correspondence with a command signal for controlling turn-ON/turn-OFF of said semiconductor laser, or an output light amount of a light beam emitted from said semiconductor laser, wherein image recording apparatus records an image using said light beam from said semiconductor laser subjected to said pulse modulation in correspondence with said command signal, wherein said semiconductor laser driving circuit comprises:

an error amplifier for amplifying a difference between said command signal and a signal fed back from said semiconductor laser to output an output signal, said output signal in a turn-ON state of said semiconductor laser being opposite in voltage polarity to said output signal in a turn-OFF state of said semiconductor laser;

a diode and a resistor connected in series between an input terminal and an output terminal of said error amplifier; and a driver for driving said semiconductor laser based on said output signal from said error amplifier, wherein said diode is connected to apply a forward bias across said diode in said turn-OFF state of said semiconductor laser, and wherein a resistance value of said resistor is set so that a current which is nearly equal in amount to that caused to flow through said error amplifier when said semiconductor laser is in said turn-ON state in case that said semiconductor laser is subjected to pulse width modulation or pulse number modulation as said pulse modulation, or when said semiconductor laser is in said turn-ON state and emits said light beam with an intermediate level amplitude in case that said semiconductor laser is subjected to pulse amplitude modulation as said pulse modulation, is caused to flow through said error amplifier in said turn-OFF state of said semiconductor laser via said diode and said resistor.

8. The image recording apparatus according to claim 7, further comprising:

a first low-pass filter that is provided between said semiconductor laser driving circuit and a substrate connector on an image processing circuit substrate to which said semiconductor laser driving circuit is mounted, and that has a cutoff frequency lower than a carrier frequency of extraneous electric wave as well as higher than an image frequency which is a driving frequency for said semiconductor laser, said extraneous electric wave having a high carrier frequency and being modulated with a frequency equal to or lower than said image frequency.

9. The image recording apparatus according to claim 8, further comprising:

a second low-pass filter that is provided on a power source line of said error amplifier and that has a cutoff frequency lower than said carrier frequency of said extraneous electric wave as well as higher than said image frequency.

10. The image recording apparatus according to claim 8, further comprising:

a high frequency superimposed circuit for superimposing a high frequency current on a driving current of said semiconductor laser; and a third low-pass filter that is provided between said semiconductor laser driving circuit and said high frequency superimposed circuit and that has a cutoff frequency lower than either lower one of a superimposed frequency of said high frequency superimposed circuit and said carrier frequency of said extraneous electric wave as well as higher than said image frequency.

11. The image recording apparatus according to claim 8, further comprising:

a high frequency superimposed circuit for superimposing a high frequency current on a driving current of said semiconductor laser; and a third low-pass filter that is provided between said high frequency superimposed circuit and said semiconductor laser and that has a cutoff frequency lower than either lower one of a superimposed frequency of said high frequency superimposed circuit and said carrier frequency of said extraneous electric wave as well as higher than said image frequency.

12. The image recording apparatus according to claim 7, further comprising:

a first lower-pass filter that is provided between said semiconductor laser driving circuit and said semiconductor laser, and that has a cutoff frequency lower than a carrier frequency of extraneous electric wave as well as higher than an image frequency which is a driving frequency for said semiconductor laser, said extraneous electric wave having a high carrier frequency and being modulated with a frequency equal to or lower than said image frequency.

* * * * *